United States Patent
Noldus et al.

(10) Patent No.: US 9,648,085 B2
(45) Date of Patent: May 9, 2017

(54) EXCHANGE OF SIGNALLING MESSAGES IN AN INTERNET PROTOCOL COMMUNICATIONS NETWORK BETWEEN ENTITIES APPLYING OBJECT ORIENTED PROCESSING OF SIGNALLING MESSAGES

(75) Inventors: Rogier August Caspar Joseph Noldus, Goirle (NL); Jos Den Hartog, Capelle a/d Ijssel (NL); Sjaak Derksen, Neiuwegein (NL); Martien Huijsmans, Oisterwijk (NL); Erik Van Der Velden, Eindhoven (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 688 days.

(21) Appl. No.: 13/884,310

(22) PCT Filed: Nov. 10, 2010

(86) PCT No.: PCT/EP2010/067230
§ 371 (c)(1),
(2), (4) Date: May 9, 2013

(87) PCT Pub. No.: WO2012/062361
PCT Pub. Date: May 18, 2012

(65) Prior Publication Data
US 2013/0227073 A1   Aug. 29, 2013

(51) Int. Cl.
*G06F 15/16* (2006.01)
*H04L 29/08* (2006.01)
*H04L 29/06* (2006.01)

(52) U.S. Cl.
CPC .......... *H04L 67/10* (2013.01); *H04L 65/1006* (2013.01); *H04L 69/02* (2013.01); *H04L 69/04* (2013.01); *H04L 69/24* (2013.01)

(58) Field of Classification Search
CPC ......... H04L 69/04; H04L 69/02; H04L 67/10; H04L 65/1006; H04L 69/24
(Continued)

(56) References Cited

U.S. PATENT DOCUMENTS

2004/0039964 A1   2/2004  Russell et al.
2007/0127447 A1   6/2007  Cho
(Continued)

FOREIGN PATENT DOCUMENTS

| EP | 1653698 A1 | 5/2006 |
| WO | 2005011175 A2 | 2/2005 |
| WO | 2008049853 A2 | 5/2008 |

OTHER PUBLICATIONS

Jin, H. et al., "Using SigComp to Compress SIP/SDP Messages", IEEE, 2005, pp. 3107-3111.
(Continued)

*Primary Examiner* — Hee Soo Kim
(74) *Attorney, Agent, or Firm* — Coats & Bennett, PLLC

(57) ABSTRACT

Signalling messages in an Internet Protocol, IP, communications network comprising a chain of at least two entities (21; 23; 29) applying object oriented processing (22; 28; 42) of signalling messages are exchanged between the at least two entities (21; 23; 29) of the IP communications network comprising object oriented based data items. Parsing and inverse parsing of text based signalling messages are effectively avoided, thereby reducing system resources and increasing processing speed of the system as a whole.

15 Claims, 4 Drawing Sheets

(58) Field of Classification Search
USPC .......................................................... 709/217
See application file for complete search history.

(56) References Cited

U.S. PATENT DOCUMENTS

2007/0198681 A1* 8/2007 Bakke ................. H04L 65/1006
709/223
2007/0258451 A1* 11/2007 Bouat ..................... H04L 29/06
370/389
2011/0016185 A1 1/2011 Zwaal et al.

OTHER PUBLICATIONS

Kumar, D. et al., "Enhancing the Performance of SIP in UMTS", First International Conference on Emerging Trends in Engineering and Technology, 2008, pp. 1126-1129, IEEE Computer Society.

Li, W. et al., "Dynamic Dictionary Design for SIP Signaling Compression", World Congress on Computer Science and Information Engineering, 2009, pp. 448-451, IEEE Computer Society.

Greanier, T., "Flatten your objects: Discover the secrets of the Java Serialization API", Javaworld, 2000, pp. 1-8.

Price, R. et al., Signaling Compression (SigComp), Network Working Group, Standards Track, Jan. 2003, pp. 1-62.

Garcia-Martin, M. et al., "The Session Initiation Protocol (SIP) and Session Description Protocol (SDP) Static Dictionary for Signaling Compression (SigComp)", Network Working Group, Standards Track, Feb. 2003, pp. 1-30.

Dong, G. et al., "Performance Enhancement of Signaling Compression in IP Multimedia Subsystem", IEEE, 2009, pp. 483-487.

* cited by examiner

EXCHANGE OF SIGNALLING MESSAGES IN AN INTERNET PROTOCOL COMMUNICATIONS NETWORK BETWEEN ENTITIES APPLYING OBJECT ORIENTED PROCESSING OF SIGNALLING MESSAGES

TECHNICAL FIELD

The present invention generally relates to signalling in an Internet Protocol, IP, communications network and, more specifically, to the exchange of signalling messages in an IP communications network comprising a chain of at least two entities applying object oriented processing of signalling messages.

BACKGROUND

Internet communications networks or Internet Protocol, IP, communications networks support a variety of telecommunications services, including voice, audio, video and other data communications. Data are exchanged in packets using a set of communications protocols independent of underlaying transport technologies.

Examples of implementations of IP communications networks are, amongst others, Voice over IP, VoIP, networks and IP Multimedia Subsystem, IMS, communications networks.

Voice over Internet Protocol, VoIP, is a general term for voice or speech communications and multimedia communications sessions over packet switched IP networks. Other terms frequently encountered and synonymous with VoIP are IP telephony, Internet telephony, Voice over broadband, VoBB, broadband telephony, and broadband phone.

Using packet switched IP networks allows for efficient allocation of network resources, as packets are routed on paths with the least congestion. Packet header information comprises information about the packet's intended destination as well as information to reconstruct the data included in the packet at a receiving entity.

The IP Multimedia Subsystem, IMS, communications network is an architectural framework defined by the wireless standard setting body 3rd Generation Partnership Project, 3GPP, amongst others for delivering IP multimedia services to user terminals operating in a circuit switched or packet switched telecommunications network, for example.

Fixed and wireless, i.e. mobile, communications such as called W-CDMA, CDMA2000, GSM, GPRS, WLAN, WiMAX, and others are supported by IMS through gateway servers. Dedicated IMS user equipment such as mobile phones, Personal Digital Assistants, PDAs, and other communication equipment may directly register with an IMS communications network. The IMS also supports roaming in other networks or countries.

IP communications networks in general and IMS communications networks in particular typically comprise a separate content domain, in IMS also called user plane, and a separate signalling domain, in IMS also called control plane. The content domain operates for the actual exchange of media, for example audio, video, or data, between a calling party and a called party, during a communications session. The signalling domain, amongst others, operates to exchange signalling or control messages in relation to a communications session between a calling and called party, not only to establish or terminate a session but also during a session to provide additional services, for example. Besides the calling and called party other entities, such as gateway servers, media servers, voice mail servers, proxy servers, such as called Proxy-Call Session Control Function, P-CSCF, servers and subscriber registrar Serving-Call Session Control Function, S-CSCF, servers associated with both the calling party and the called party may be involved in a communication session.

The signalling protocol used in IMS communications networks is called Session Initialisation Protocol, SIP. SIP is a standardised application-layer control protocol for the exchange of signalling messages between entities of an IMS communications network. Using SIP provides for many advantages, for example, its scalability, its implementation and its support for both IP and conventional telephone communications.

The SIP protocol is text-based and incorporates many elements of the HyperText Transfer Protocol, HTTP, and the Simple Mail Transfer Protocol, SMTP. SIP call establishment poses large requirements on SIP entity processing capacity. The text based aspects of SIP imply that keywords and labels within a signalling message are recognized through 'byte-by-byte' character comparison. Headers of a SIP message have a high degree of flexibility in terms of their position in the SIP message. This means that when decoding (parsing) a SIP message, the decoder has to read the SIP message line-by-line, until the required SIP header is found. Keywords and labels in SIP message are generally case-insensitive. This has the effect that for recognizing keywords and labels, a parser has to convert each and every character, where case insensitivity applies, to a normalized case, such as upper case for example. Further, the headers in SIP messages have a variable length. There is no length indicator per line of text. This implies that when reading a line, a parser has to continue reading characters until a <carriage return><line feed>, <CR><LF>, combination is encountered.

These aspects, when using text-based signalling messages in an IP communications network, amongst others cause a relatively high processing load on the signalling processing entities in the network and consume a substantial amount of resources within such entities for encoding and decoding of the signalling messages. Further, text based signalling messages are regarded as being vulnerable to eavesdropping.

Object oriented programming languages, such as but not limited to JAVA, C#, C++, dot NET, Python, Perl and Ruby, are suitable for object oriented programming for executing operations in servers of, for example, an IP communications network. These object oriented programming languages utilize object oriented based data items such as object classes.

In present IMS communications networks, for example, JAVA is a commonly used object oriented programming language accommodated with a comprehensive SIP library, for applying object oriented processing of signalling messages by the service logic of an entity operating in the communications network.

Entities of an IP communications network which process received text based signalling messages applying object oriented programming, are arranged to convert (parse) received text based signalling messages into object oriented based data items, for a JAVA Application Programming Interface, API, to operate. The entities are also arranged to reconstruct object oriented based data items back to text based signalling messages (the inverse of the parsing process) for exchanging same with a next entity of a chain of entities in an IP communications network.

The conversion of text-based signalling messages to and from object oriented based data items causes a high load on the entities handling these signalling messages. In other words, this is very resource intensive for these entities.

Future utilization and the number of IP communications networks are expected to grow gradually, due to, among others, the increasing demand for IP services of users of communications devices, such as mobile telephones and other user equipment. One of the challenges for operators of IP communications networks is to facilitate this increasing demand and, at the same time, maintain or improve the reliability, efficiency and robustness of their network as a whole and the signalling domain in particular.

SUMMARY

It is an object to provide an improved method of exchanging signalling messages in an IP communications network.

It is another object to provide for an entity for use in an IP communications network supporting the improved method of exchanging signalling messages.

It is a further object to provide for an IP communications system comprising at least two entities supporting the improved method of exchanging signalling messages.

In a first aspect there is provided a method of exchanging signalling messages in an Internet Protocol, IP, communications network, the IP communications network comprising a chain of at least two entities applying object oriented processing of signalling messages. The method is characterised in that signalling messages exchanged between the at least two entities of the IP communications network comprise object oriented based data items.

The improved method is based on the insight that if communicating entities in a network are arranged for applying object oriented processing of signalling messages, utilization of resources of these entities is reduced when signalling messages exchanged between these entities comprise object oriented based data items. The use of resources of entities in the communications network is mainly reduced since these entities do not need to convert text based signalling messages to object oriented based signalling messages, and vice versa.

By removing both types of conversions, a significant reduction in the processing time of signalling messages is achieved due to the absence of the time-consuming parsing process and the inverse of the parsing process, as detailed in the background section above. In particular, when an increasing amount of signalling entities applying processing of object oriented based data items are chained in an IP communications network, due to the absence of multiple conversions of the signalling messages exchanged, the improved method not only drastically improves the efficiency of the signalling process of the network but also enhances the reliability and robustness of the signalling domain and thereby the performance of the network as a whole. The decrease in resource utilization when applying the improved method leads to, among others, an increase in the capacity of the IP communications network.

In addition to the decrease in resource utilization, the exchange of signalling messages in the IP communications network using the improved method becomes less vulnerable to eavesdropping of, for example, third parties. For third parties it is much more difficult to directly derive useful information from signalling messages exchanged between entities in the communications network comprising object oriented based data items as compared to text based signalling messages.

Another advantage of the improved method is that unnecessary overhead during the exchange of signalling messages is reduced, thereby further improving the efficiency of the communications network.

The chain of at least two entities applying object oriented processing of signalling messages may exist between a calling party and a called party, for example, as well as between a calling party and several called parties, or vice versa. In other words, the chain does not need to solely comprise consecutively traversed or coupled entities between a calling party and a called party.

In general, entities in modern IP communications networks are arranged to apply modern Object Oriented, OO, programming languages such as for example JAVA, C++, C#, dot NET, Python, Perl, Ruby and the like for handling signalling messages. The improved method is applicable for use by entities applying such object oriented languages for the processing of signalling messages.

In a further aspect of the improved method, the object class based data items are one of an OO programming language.

JAVA is a commonly used object oriented programming language for entities in IMS communications networks processing SIP signalling messages. Accordingly, in IMS communications networks, the improved method is, among others, applicable to entities applying JAVA processing. Within an IMS communications network, the improved method of exchanging signalling messages is not only applicable to SIP but may also be applied to Diameter signalling messages. Diameter signalling messages are used between servers in the IMS communications network, such as an Interrogating-CSCF, I-CSCF, server and Home Subscriber Server, HSS, during call establishment and, when the called party, i.e. the destination subscriber, is currently not registered, between the S-CSCF server and the HSS server.

It will be appreciated that the improved method may also be used for other signalling protocols that are based on similar principles, such as Hypertext Transfer Protocol, HTTP, and the Real Time Streaming Protocol, RTSP. Further, the signalling messages may be compressed using any compressing technique for efficient transportation of the signalling messages.

In another aspect the object oriented based data items are serialised by an entity of the chain for exchanging serialised object oriented based data items between entities of the chain.

Serialising object oriented based data items comprises converting a data structure, for example an object class, into a sequence of bits so that the transport of object oriented based data items is simplified. This process of serialising a data structure is also often referred to as deflating or marshalling a data structure.

In the receiving entity, according to another aspect, the received bit sequence is de-serialised for applying object oriented processing of the object oriented based data items.

In a further aspect an instance of the signalling messages exchanged between the at least two entities comprises a designation string indicating that the instance comprises serialised object oriented based data items. By interpreting the designation string, a receiving entity determines that the object oriented based data items, such as a set of JAVA object classes, is encoded in binary, serialised form, such that a de-serialising process may be started for processing of the signalling message. The designation string may be incorporated, for example, in the header of signalling message exchanged between entities of the IP communications network.

In another aspect with exchanging the signalling messages the entities exchange a parameter indicating whether an entity of the chain is arranged for exchanging object oriented based data items. The parameter may be exchanged in any of a request and response signalling message, for example.

From this parameter, entities gain knowledge whether the signalling message to a subsequent entity has to be exchanged as a regular text based message or as a message comprising object oriented based data items according to the improved method. Based on this indication, an entity in the IP communications network may apply conversion of the text based message to object oriented based data items or vice versa.

In a further aspect, prior to exchanging signalling messages, the entities of the IP communications network exchange a parameter indicating whether an entity of the chain is arranged for exchanging object oriented based data items.

Here, it is not necessary to include such a parameter in, for example, the header of every signalling message exchanged between entities in the IP communications network. By determining beforehand which entities are capable of receiving object oriented based data items, signalling overhead is decreased.

Based on this parameter, an entity of the chain may directly forward signalling messages according to the improved method knowing that the receiving entity is able to process same. In an IMS communications network applying SIP signalling, for example, the parameter or the designation string is exchanged in at least one of a SIP Register, a SIP Invite and a SIP Response message.

In yet another aspect the parameter comprises at least one of a first port number for exchanging signalling messages comprising object class based items and a second port number for exchanging signalling messages not comprising object oriented based data items.

Dependent on the value of the parameter, i.e. the applicable port number, signalling messages may be routed for correctly processing same by a receiving entity.

In a further aspect, the entities of the chain operate in an IP communications network supporting Voice over IP, VoIP, communications. Reference is made to the background section above concerning VoIP.

According to another object, there is provided an entity comprising a signalling module arranged for applying object oriented processing of signalling messages in an Internet Protocol, IP, communications network. The entity is characterised in that the signalling module is arranged for exchanging in the IP communications network signalling messages comprising object oriented based data items, in accordance with the improved method disclosed above.

In yet another aspect the entity comprises a transmission module arranged for serialising of object oriented based data items and for de-serialising of received serialised object oriented based data items, for exchanging serialised object oriented based data items in the IP communications network.

In a further aspect the entity comprises a version module arranged for exchanging in the IP communications network object oriented programming version information.

For example, when processing software for signalling messages in one or more entities is updated, within the chain of entities different versions of, for example, the set of JAVA Object classes may exist. By exchanging such version information, processing errors due to different software versions are effectively avoided.

In a further object there is provided an IP communications system, such as an IMS communications system, comprising at least two entities arranged for applying object oriented processing of signalling messages. The IP communications network is characterized in that the at least two entities of the IP communications system each comprise a signalling module arranged for exchanging in the IP communications system signalling messages comprising object oriented based data items, in accordance with the improved method disclosed above.

The improved method, entity and IP communications system disclosed above benefit form a greatly reduced signalling transmission in the IP communications network. This may lead to cost saving in the network infrastructure. In addition, the time and resource consuming parsing in entities of the IP communications network, such as servers, nodes, gateways, and the like is greatly alleviated which may lead to an increase in the communication capacity of the entity, because the processing power and memory usage which is at present occupied by the parsing process may, to a certain extent, be used for communication purposes, such as handling calls. Call establishment duration will be shortened which will be positively perceived by the users of the network.

The above-mentioned and other features and advantages of the invention will be best understood from the following description referring to the attached drawings. In the drawings, like reference numerals denote identical parts or parts performing an identical or comparable function or operation.

Although the examples presented relate to an IMS communications network and system, using SIP signalling and JAVA object classes, the above disclosed improved method, entity and IP communications network and system are not to be construed as limited to IMS, SIP or JAVA services. To the contrary, the invention may be applied in any IP communications network applying text based signalling messages and object oriented processing of signalling messages applying object oriented data items, such as C++, .Net, Python, Perl and Ruby based object oriented data items.

DETAILED DESCRIPTION

Figure 1:
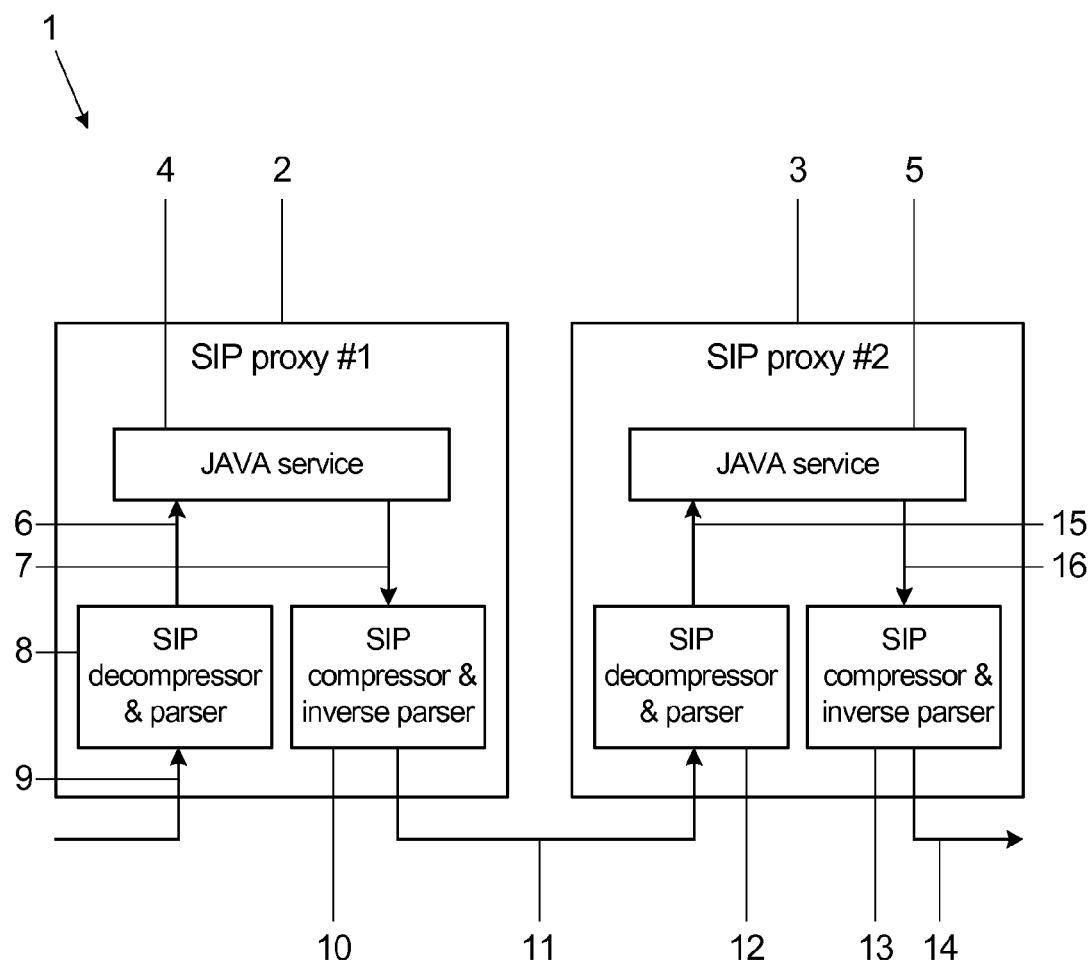
FIG. 1 is a schematic view of handling SIP text based signalling messages exchanged between entities in an IMS communications network.

FIG. 1 is a schematic view of handling text based Session Initiation Protocol, SIP, signalling messages between entities 2, 3 forming a signalling chain in an Internet Protocol Multimedia Subsystem, IMS, communications network 1. The term entity as used in the present description and claims refers to any network communication device arranged for processing signalling messages, such as servers, nodes, gateways, proxies, and the like.

A SIP proxy #1 entity 2 receives text based SIP signalling messages 9 at a SIP decompressor & parser 8. The SIP proxy

1 entity 2 can be any entity operative in an IP communications network, for example a Serving-Call Session Control Function, S-CSCF, a Proxy-Call Session Control Function, P-CSCF, an Application Server, AS, an Interrogating-Call Session Control Function, I-CSCF, a Home Subscriber Server, HSS, and others. Note that in the latter case, instead of the SIP signalling messages 9, signalling messages according to the Diameter protocol are received.

The incoming text based SIP messages 9 may be raw text based messages or compressed using available compression techniques, for example lossless or even lossy data compression technology. The incoming text based SIP messages 9 are processed by the SIP decompressor & parser 8. The SIP decompressor & parser 8 converts the text based SIP messages 9 to JAVA object classes 6. The JAVA object classes 6 are processed by the SIP proxy #1 entity 2 using a JAVA service 4.

SIP signalling messages to be transmitted by the SIP proxy #1 are provided by the JAVA service 4 and comprise JAVA object classes 7. The SIP proxy #1 entity 2 prepares text based SIP signalling messages 11, using a SIP compressor & inverse parser 10 for converting the JAVA object classes 6 back to text based messages 11. The text based SIP messages 11 may comprise identical content compared to the incoming SIP messages 9 or a non-identical content, modified by the JAVA service 4 of the SIP proxy #1 entity 2.

A SIP proxy #2 entity 3 receives text based SIP messages 11 sent from the SIP proxy #1 entity 2 at a SIP decompressor & parser 12. Again, received text based SIP messages 11 are decompressed & parsed by the SIP decompressor & parser 12 for converting these signalling messages to JAVA object classes 15, such that the SIP proxy #2 entity 3 is able to process the messages internally using a JAVA service 5. Again, before the messages are sent or forwarded to a next entity in the IMS network 1, JAVA object classes 16 are converted to text based signalling messages 14, using a SIP compressor & inverse parser 13. As will be appreciated, the SIP proxy #2 entity 3 may be any entity operative in an IP communications network as disclosed above with respect to SIP proxy #1 entity 2.

Figure 2:
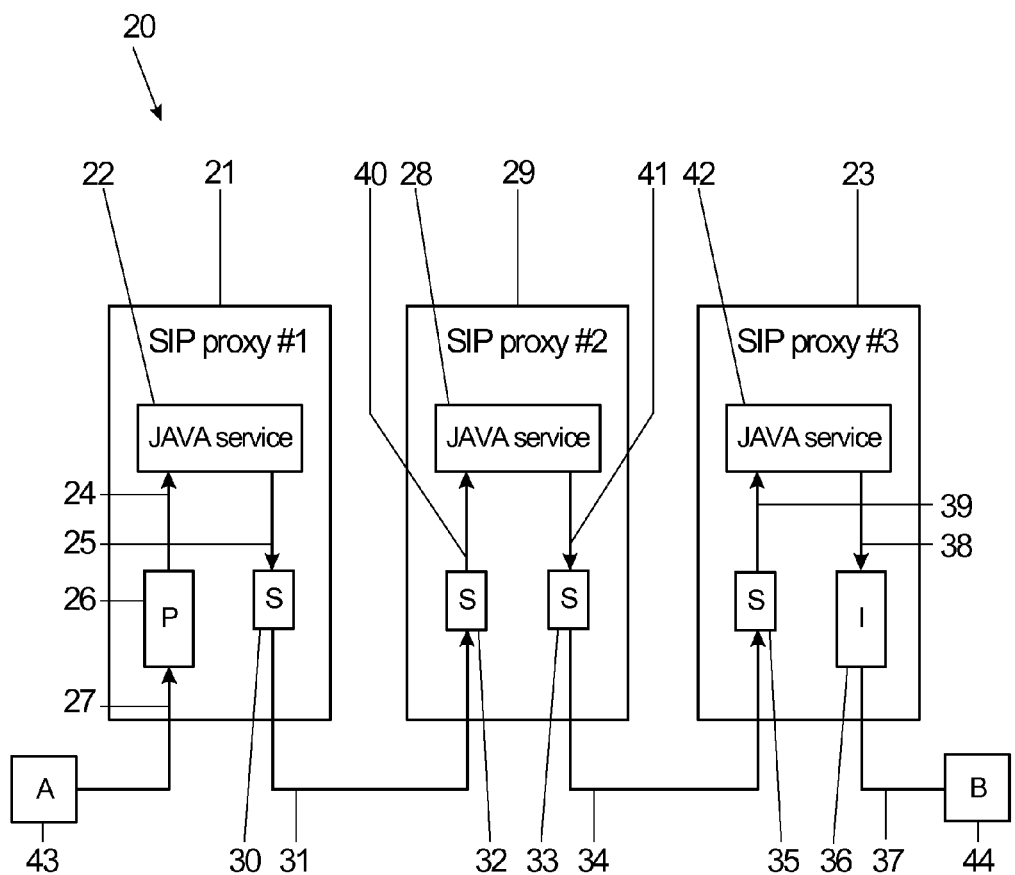
FIG. 2 is a schematic view of an example of handling signalling messages between entities in an IMS communications network according to an example of the improved method.

FIG. 2 is a schematic view of an example of handling signalling messages between entities 21, 23, 29 chained in an IMS network 20 according to an example of the improved method of the present invention. Here, a calling party A or User Equipment, UE, 43 sends a text based SIP message 27 to a SIP proxy #1 entity 21 via a decompressor & parser P 26. The SIP message 27 may comprise a SIP Invite request message, SIP Register message or any other type of SIP message known in the art. More generally, in IP communication networks the message 27 does not necessarily need to comprise a SIP message, it may consist of any type of text based signalling message.

Again, the SIP proxy #1 entity 21 may be any entity operative in an IP communications network as disclosed above with respect to SIP proxy #1 entity 2 (FIG. 1). In the particular example SIP proxy #1 entity 21 is a P-CSCF server in the IMS communications network 20 for supporting VoIP, for example.

The decompressor & parser 26 converts SIP text based signalling messages 27, or any other type of text based message, to JAVA object classes 24. In this example, the SIP proxy #1 entity 21 is arranged to apply object oriented processing of signalling messages using a JAVA service 22.

After the JAVA service 22 has internally processed the JAVA object classes 24 of a received signalling message and, for example, as result hereof has to transmit a signalling message to a next entity, i.e. SIP proxy #2 entity 29, in the chain, the SIP proxy #1 entity 21 is arranged to forward the processed JAVA object class 25 directly to the SIP proxy #2 entity 29. That is no inverse parsing and, if applicable, data compression are applied to the JAVA object classes 25 provided by the JAVA service 22 before transmission thereof to SIP proxy #2 entity 29. Accordingly, SIP signalling messages are exchanged between the SIP Proxy #1 entity 21 and the SIP Proxy #2 entity 29 comprising object oriented based data items.

The SIP proxy #2 entity 29 may be any entity operative in an IP communications network as disclosed above with respect to SIP proxy #1 entity 2 (FIG. 1). In the particular example SIP proxy #1 entity 21 is an S-CSCF server and/or I-CSCF server in the IMS communications network 20.

The next entity in the IMS network 20, i.e. the SIP proxy #2 entity 29, is arranged to process received signalling messages 40 using a JAVA service 28. In this case, the exchanged JAVA object classes 25 do not need to be decompressed & parsed at the SIP proxy #2 entity 29. Thus, in accordance with the improved method, signalling messages comprising object oriented based data items, for example JAVA object classes 25, are exchanged between entities of an IP communications network, for example SIP proxy #1 entity 21 and SIP proxy #2 entity 29.

In this particular example, the JAVA object classes 25 provided by the JAVA service 22 are converted to serialised JAVA object classes 31 using a transmission module S 30 of the SIP proxy #1 entity 21. Serialisation is the process of converting a data structure or object, in this case an object oriented data item, into a sequence of bits. This sequence of bits allows, among others, for conveniently transporting the data structure or object to another entity in a network, for example SIP proxy #2 entity 29. The receiving SIP proxy #2 entity 29 is arranged to deserialize the received JAVA object classes 31 using a transmission module S 32 for processing of JAVA object classes 40 by the JAVA service 28.

The utilization of resources of the SIP proxy #1 entity 21 and the SIP proxy #2 entity 29 is considerably less for serialisation/deserialization of JAVA object classes compared to compression/decompression and parsing of text based signalling messages. Therefor the load on these entities and the processing times as a whole are considerably reduced. Another advantage of the improved method is that eavesdropping on signalling messages 31 exchanged between the entities 21, 29 is more difficult, since these message are no longer text based messages.

The SIP proxy #2 entity 29 processes de-serialised JAVA object classes 40 using the JAVA service 28. For sending JAVA object classes 41 to a next entity in the chain of the IMS network 20, that is SIP proxy #3 entity 23, the JAVA object classes 41 are again serialised into serialised JAVA object classes 34 using a transmission module S 33.

The SIP proxy #3 entity 23 receives the serialised JAVA object classes 34 and processes same in a like manner as SIP proxy #1 entity 21, for example, using a transmission module S 35 and JAVA service 42.

The SIP proxy #3 entity 23 may be any entity operative in an IP communications network as disclosed above with respect to SIP proxy #1 entity 2 (FIG. 1). In the particular example SIP proxy #3 entity 23 is a P-CSCF server in the IMS communications network 20.

Calling party B or UE 44 is not arranged to apply object oriented processing of received signalling messages 37. Therefore, the SIP proxy #3 entity 23 is arranged to compress, if applicable, and inverse parse JAVA object classes 38 for transmission to UE 44, using a compressor & inverse parser I 36. Text based SIP signalling messages 37 are then sent to the calling party B 44 as disclosed above with respect to FIG. 1.

It will be appreciated that in setting up communication sessions between the UE 43, 44 and during such sessions, signalling messages have to be exchanged in both ways between the entities 21, 23, 29 and the UE 43, 44. To this end, each entity 21, 23, 29 comprises transmission modules S providing both serialising and de-serialising of JAVA object classes back and forth. SIP proxy #1 entity 21 may likewise comprise a compressor & inverse parser I 36, disclosed with respect to SIP proxy #3 entity 23 for transmitting text based signalling messages to UE 43. SIP proxy #3 entity 23 may comprise a decompressor & parser P 26, disclosed with respect to SIP proxy #1 entity 21 for receiving text based signalling messages from UE 44. The decompressor & parser 26 and compressor & inverse parser may be combined in a single unit or module.

Figure 3:
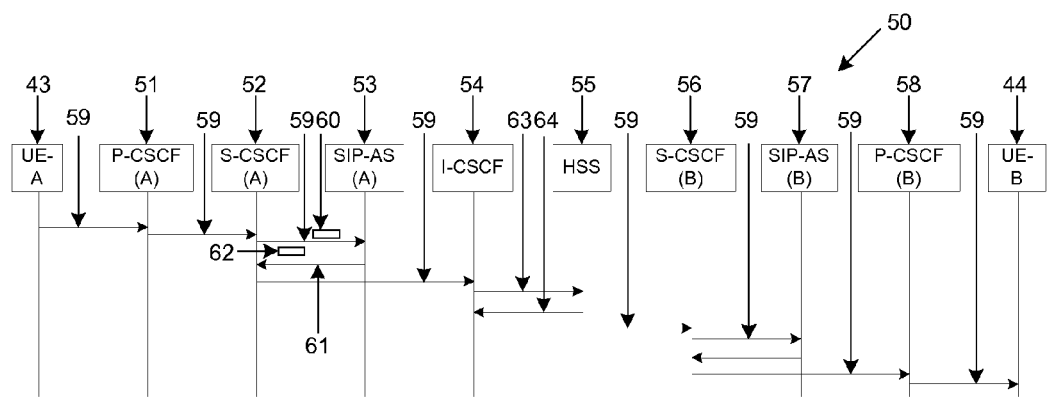
FIG. 3 is a schematic view of message transfers between entities in an IMS network.

FIG. 3 is a schematic view of message transfers between entities in an IMS network 50 according to the improved method. Here, the UE 43 initiates, for example, a communication session by sending a SIP Invite 59 message to its associated P-CSCF 51. To discover its associated P-CSCF 51, the UE 43 first applies P-CSCF discovery using, for example, any form of Dynamic Host Configuration Protocol, DHCP, such as DCHPv6, or by requesting the P-CSCF address as part of PDPc establishment process. The UE 43 receives the P-CSCF 51 address in the form of a Uniform Resource Identifier, URI, plus URI parameters.

These URI parameters may comprise a parameter indicating whether an entity, for example the P-CSCF 51, is arranged for exchanging object oriented based data items. The parameter may also be utilized for version information, for example version information of the object oriented programming version. Although this example is directed to SIP Invite 59 messages other type of messages may be used utilizing the same principle.

Whenever the P-CSCF 41 forwards the SIP invite 59 message to a S-CSCF 52, it uses a service route, which the S-CSCF 52 had previously returned towards the P-CSCF 41. Such a service route comprises the S-CSCF 52 address as well as URI parameters. Again, these URI parameters may comprise a parameter indicating whether the S-CSCF 52 is arranged for exchanging object oriented based data items, for example serialized object oriented based data items.

The SIP Invite 59 message is then forwarded from the S-CSCF 52 to a SIP-AS 53 and back. Here, the S-CSCF 52 may add a parameter 60 to the SIP Invite 59 message indicating that the S-CSCF 52 is arranged for exchanging object oriented based data items. The SIP Invite 59 message sent from the SIP-AS 53 to the S-CSCF 52 may already comprise object oriented based data items, that is, if the SIP-AS 53 is also arranged for exchanging object oriented based data items. A SIP Response message 61, sent from the SIP-AS 53 to the S-CSCF 52 may then comprise a designation string 62 indicating that the SIP Response message 61 comprises object oriented based data items.

The S-CSCF 52, then, forwards the SIP Invite 59 message to an I-CSCF 54, which acts as a main inbound proxy for a domain name of the called UE 44. The I-CSCF 54 queries a Home Subscriber Server, HSS, 55 for the location of the called UE 44. The I-CSCF 54 then forwards the SIP Invite 59 message to the S-CSCF 56 associated with the called UE 44.

When the I-CSCF 54 intends to forward a SIP Invite 59 message to the S-CSCF 56 it either determines the S-CSCF 56 address from internal configuration or asks/receives 63/64 the S-CSCF 56 address at/from the HSS 55. In case of internal configuration, the internally configured S-CSCF 56 address may comprise a parameter 60 indicating whether the S-CSCF 56 is arranged for exchanging object oriented based data items. In case of receiving the S-CSCF 56 address from the HSS 55, the HSS provides the S-CSCF 56 address as well as the parameter.

The parameter 60 may comprises at least one of a first port number for exchanging signalling messages comprising object oriented based data items and a second port number for exchanging signalling messages not comprising object oriented based data items.

A similar reasoning, as explained above, is applied for messages exchanged between the SIP-AS 57, P-CSCF 58 and the called UE 44. Basically, the address of the next entity in the network to which a message is to be forward may be obtained in three ways. First, the address of the next entity was already provided by the next entity in previous exchange of messages. Second, the address of the next entity is internally configured and third, the address of the next entity is received during registration of a user.

The method according to the invention may also be applicable for non SIP messaging, for example Diameter messages. Diameter is used during a communication session establishment, between the I-CSCF 54 and the HSS 55 and, if the called UE-B 44 is currently not registered in the S-CSCF 56, between the S-CSCF 56 and the HSS 55.

Whenever an entity in an IMS network 50 receives a message, it needs to determine whether the message is exchanged comprises a regular SIP text based message or an object oriented based data items. Hereto, one of the following methods, or a combination thereof, may be applied.

First, a designated application identifier may be used, which identifier indicates to the receiving entity whether the message exchanges comprises a regular SIP text based message or an object oriented based data item. Second, en entity in the IMS network may utilize two port numbers for exchanging messages, one port number for messages comprising regular text based messages and the other port number for messages comprising object oriented based data items.

Figure 4:
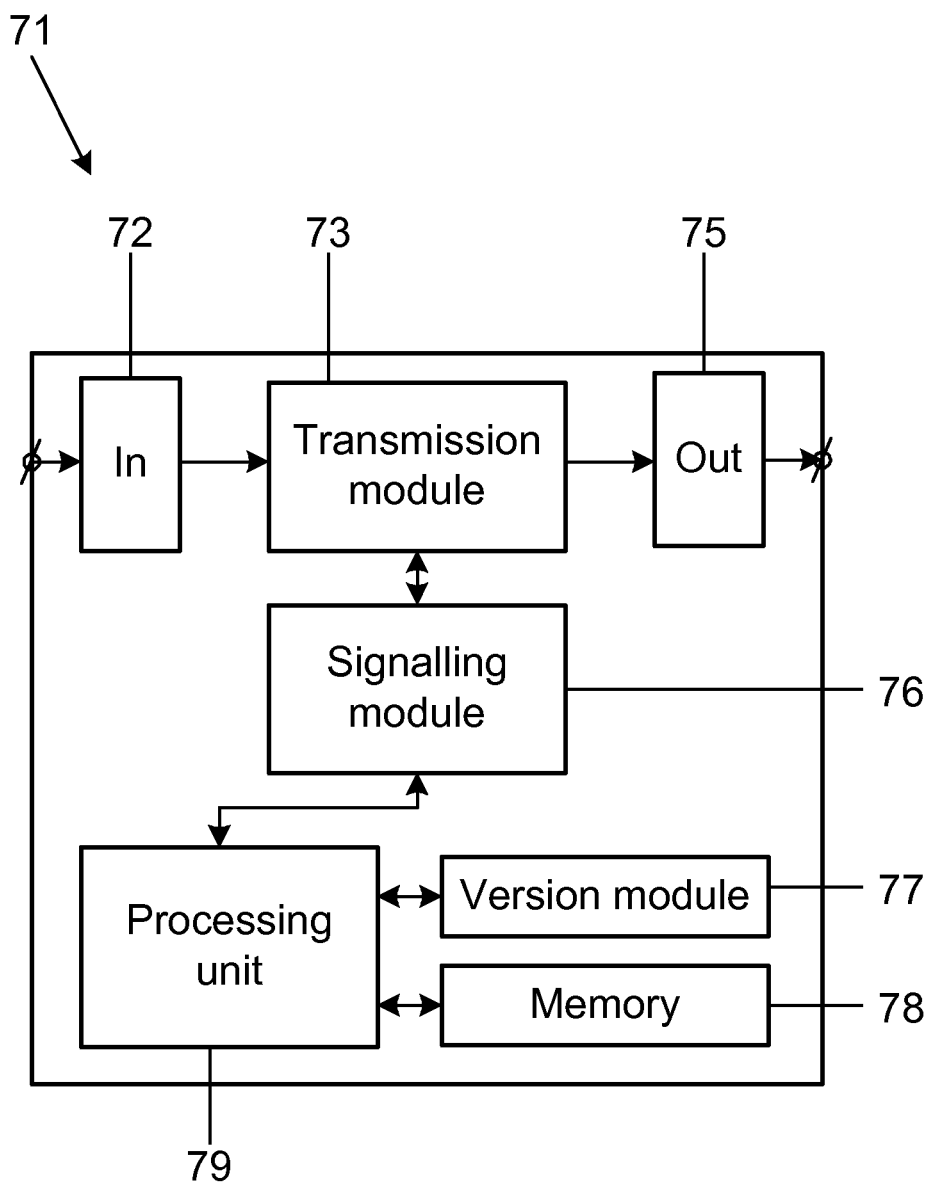
FIG. 4 is a schematic view of an entity for use in an IP communications network, applying the improved method of FIG. 2.

FIG. 4 schematically shows an entity 71 for use in an IP communications network and arranged for exchanging signalling messages comprising object oriented based data items. The entity 71 represents any communication device arranged for processing signalling messages in an IP communications system, such as a server, node, gateway, proxy, and the like.

The entity 71 comprises an input unit 72 having an input port and an output unit 75 having an output port for receiving and sending signalling messages in an IP communications network. The input and output units 72, 75 connect to a transmission module 73. The transmission module 73 connects to a signalling module 76 which is arranged exchanging signalling messages comprising object oriented based data items. The signalling module 76 connects to a processing unit 79, amongst others arranged for applying object oriented processing of signalling messages, such as a JAVA service for processing SIP signalling messages applying JAVA object classes.

The transmission module 73 is arranged for serialising and de-serialising of signalling messages comprising object oriented based data items, as explained above in connection with FIG. 2. If no serialising is applied, the input and output units 72, 75 may connect directly to the signalling module 76.

A memory 78 and version module 77 connect to the processing unit 79, such to ensure that signalling messages are processed in accordance with the appropriate version of JAVA software, for example.

The signalling module 76 may further be arranged for receiving an interpreting parameters indicating whether a neighbouring entity in a chain of entities is arranged for exchanging signalling messages comprising object oriented based data items. For exchanging text based signalling messages, the entity 71 may comprise a decompressor & parser 26 and a compressor and inverse parser 36 disclosed above in connection with FIG. 2. Separate input and output ports may be provided for the exchange of text based signalling messages.

In such a case the parameter comprises at least one of a first port number for exchanging signalling messages comprising object oriented based data items and a second port number for exchanging signalling messages not comprising object oriented based data items, such as text based signalling messages.

It will be appreciated by those skilled in the art that the functionality disclosed in relation to the improved method, entity and IP communications system may be applied in special hardware, software, or a combination thereof.

The invention is not limited to the embodiments described, but can be practice with modification and alteration within the spirit and scope of the appended claims.

The invention claimed is:

1. A method of exchanging signaling messages in an Internet Protocol (IP) communications network, the IP communications network comprising a chain of at least two entities configured to process object oriented signaling messages, the method comprising:
   at a first network entity in the chain:
      receiving a signaling message, wherein the signaling message comprises one of a text-based signaling message and an object-oriented based signaling message comprising serialized object classes of an object oriented programming language;
      responsive to the signaling message being a text-based signaling message, converting the signaling message to the object-oriented based signaling message;
      responsive to the signaling message being an object-oriented based signaling message, processing the signaling message without parsing the signaling message; and
      transmitting the object-oriented based signaling message from the first network entity in the chain to a second network entity in the chain causing the second network entity to process the object-oriented based signaling message without parsing the object-oriented based signaling message.

2. The method of claim 1, wherein the object classes of the object oriented programming language are JAVA object classes.

3. The method of claim 1, further comprising, prior to transmitting the object-oriented based signaling message to the second entity in the chain, serializing the object classes of the object-oriented based signaling message.

4. The method of claim 3, wherein the object-oriented based signaling message sent to the second network entity comprises a designation string indicating that the object-oriented based signaling message comprises the serialized object classes of the object oriented programming language.

5. The method of claim 3, wherein processing the signaling message without parsing the signaling message comprises:

de-serializing the received serialized object classes of the object oriented programming language; and
applying object oriented processing of to the de-serialized object classes of the object oriented programming language.

6. The method of claim 1, further comprising exchanging, with the second network entity prior to receiving the first signaling message, a parameter indicating whether one or both of the first and second network entities are configured to exchange object classes of an object oriented programming language.

7. The method of claim 1, further comprising exchanging a parameter with the second network entity indicating whether one or both of the first and second network entities are configured to exchange object classes of an object oriented programming language.

8. The method of claim 6:
   wherein the first and second network entities of the chain operate in an IP Multimedia Subsystem (IMS) and exchange Session Initiation Protocol (SIP) signaling messages; and
   wherein the parameter is exchanged in at least one of a SIP Register, a SIP Invite, and a SIP Response signaling message.

9. The method of claim 8, wherein the parameter comprises at least one of:
   a first port number for exchanging signaling messages comprising the object classes of the object oriented programming language; and
   a second port number for exchanging signaling messages not comprising the object classes of the object oriented programming language.

10. The method of claim 1, wherein the first and second network entities of the chain operate in an IP communications network supporting Voice over IP (VoIP) communications.

11. A network entity comprising:
    one or more processing circuits operable as a signaling circuit and configured to:
       receive a signaling message, wherein the signaling message comprises one of a text-based signaling message and an object-oriented based signaling message comprising serialized object classes of an object oriented programming language;
       responsive to the signaling message being a text-based signaling message, convert the signaling message to an object-oriented based signaling message;
       responsive to the signaling message being an object-oriented based signaling message, process the signaling message without parsing the signaling message; and
       transmit the object-oriented based signaling message from the first network entity in the chain to a second network entity in the chain causing the second network entity to process the object-oriented based signaling message without parsing the object-oriented based signaling message.

12. The entity of claim 11, wherein the object classes of the object oriented programming language are JAVA object classes.

13. The entity of claim 11:
    wherein the one or more processing circuits comprise a transmission circuit configured to:
       serialize the object classes of the object oriented programming language for transmission to the second network entity; and responsive to the signaling message being the object-oriented based signaling message, de-serialize the serialized object classes of the object oriented programming language received at the first network entity.

14. The entity according to claim 11, wherein the one or more processing circuits are further configured to exchange object oriented programming version information in the IP communications network.

15. An Internet Protocol (IP) communications system comprising:
   at least first and second network entities configured to:
      communicate signaling messages with each other, wherein each signaling message comprises one of a text-based signaling message and an object-oriented based signaling message comprising serialized object classes of an object oriented programming language;
      for each signaling message that is a text-based signaling message, convert the signaling message to an object-oriented based signaling message;
      for each signaling message that is an object-oriented based signaling message, process the signaling message without parsing the signaling message; and
      transmit the object-oriented based signaling message from the first network entity in the chain to a second network entity in the chain causing the second network entity to process the object-oriented based signaling message without parsing the object-oriented based signaling message.

* * * * *

UNITED STATES PATENT AND TRADEMARK OFFICE
CERTIFICATE OF CORRECTION

PATENT NO. : 9,648,085 B2  
APPLICATION NO. : 13/884310  
DATED : May 9, 2017  
INVENTOR(S) : Noldus et al.

Page 1 of 1

It is certified that error appears in the above-identified patent and that said Letters Patent is hereby corrected as shown below:

In the Specification

In Column 9, Line 38, delete "P-CSCF 41" and insert -- P-CSCF 51 --, therefor.

In Column 9, Line 40, delete "P-CSCF 41." and insert -- P-CSCF 51. --, therefor.

In the Claims

In Column 12, Line 3, in Claim 5, delete "processing of to" and insert -- processing to --, therefor.

Signed and Sealed this
Twenty-sixth Day of March, 2019

Andrei Iancu
*Director of the United States Patent and Trademark Office*